United States Patent [19]

Nakayama et al.

[11] Patent Number: 5,153,728
[45] Date of Patent: Oct. 6, 1992

[54] IMAGE ENLARGEMENT APPARATUS USING PLURAL DIVERSE CAPACITY MEMORIES

[75] Inventors: Tadayoshi Nakayama, Tokyo; Koji Takahashi, Kanagawa, both of Japan

[73] Assignee: Canon Kabushiki Kaisha, Tokyo, Japan

[21] Appl. No.: 484,893

[22] Filed: Feb. 26, 1990

[51] Int. Cl.⁵ .............................................. H04N 5/76
[52] U.S. Cl. .................................... 358/180; 358/224
[58] Field of Search ............... 358/180, 140, 213.13, 358/213.26, 108, 224

[56] References Cited

U.S. PATENT DOCUMENTS

| | | | |
|---|---|---|---|
| 3,935,381 | 1/1976 | Petrocelli et al. | 358/180 |
| 4,002,824 | 1/1977 | Petrocelli | 358/180 |
| 4,302,776 | 11/1981 | Taylor et al. | 358/180 |
| 4,589,029 | 5/1986 | Torimaru et al. | 358/224 |
| 4,740,839 | 4/1988 | Phillips | 358/180 |
| 4,779,135 | 10/1988 | Judd | 358/180 |
| 4,930,014 | 5/1990 | Maeda et al. | 358/180 |

*Primary Examiner*—Stephen Brinich
*Attorney, Agent, or Firm*—Robin, Blecker, Daley & Driscoll

[57] ABSTRACT

An image processing device comprises an enlarging process circuit which is capable of forming an enlarged image by using a memory which is capable of storing one picture amount of a video signal, a combining process circuit for producing a composite image consisting of the output of the enlarging process circuit and an input video signal, a selection circuit which selects a combining pattern for the combining process circuit, and a switching circuit for changing the timing of writing or reading into or out of the memory disposed within the enlarging process circuit in accordance with the selecting action of the selection circuit.

25 Claims, 10 Drawing Sheets

IMAGE ENLARGEMENT APPARATUS USING PLURAL DIVERSE CAPACITY MEMORIES

BACKGROUND OF THE INVENTION

1. Field of the Invention

This invention relates to an image processing device and more particularly to an image processing device which has an image enlarging function.

2. Description of the Related Art

Figure 1A:
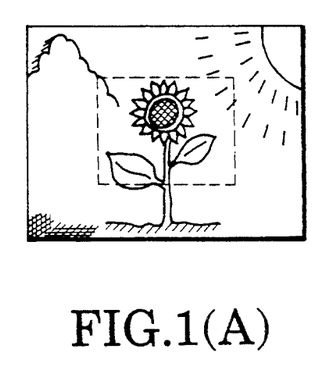
FIGS. 1(A) and 1(B) show by way of example images processed by the conventional image enlarging process.
Figure 1B:
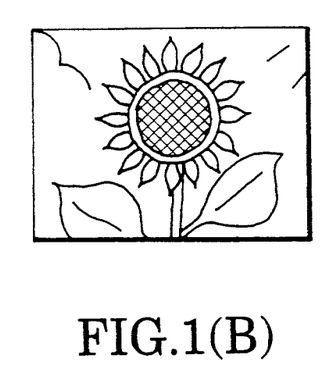
Figure 2:
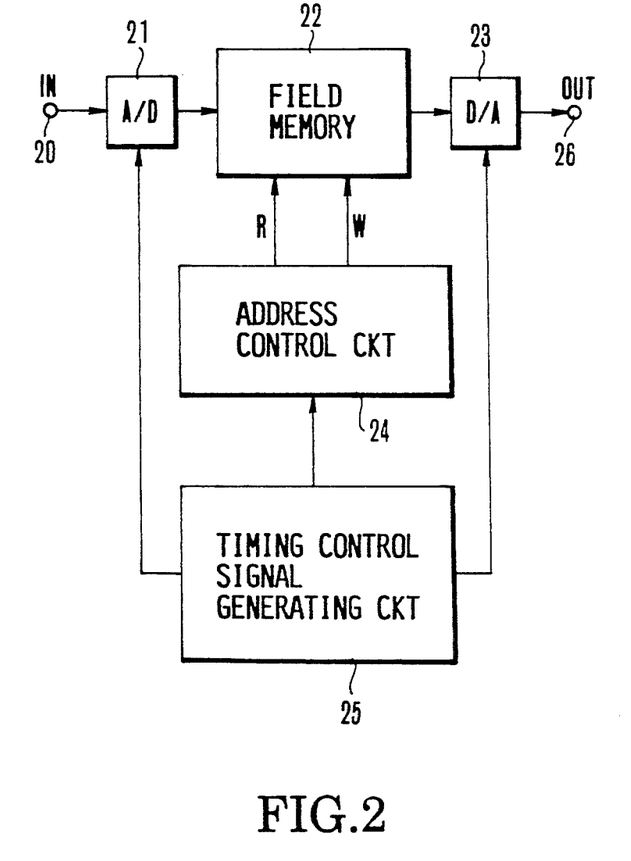
FIG. 2 is a block diagram showing by way of example the arrangement of the conventional image processing circuit which performs an image enlarging process.
Figures 3A, 3B:
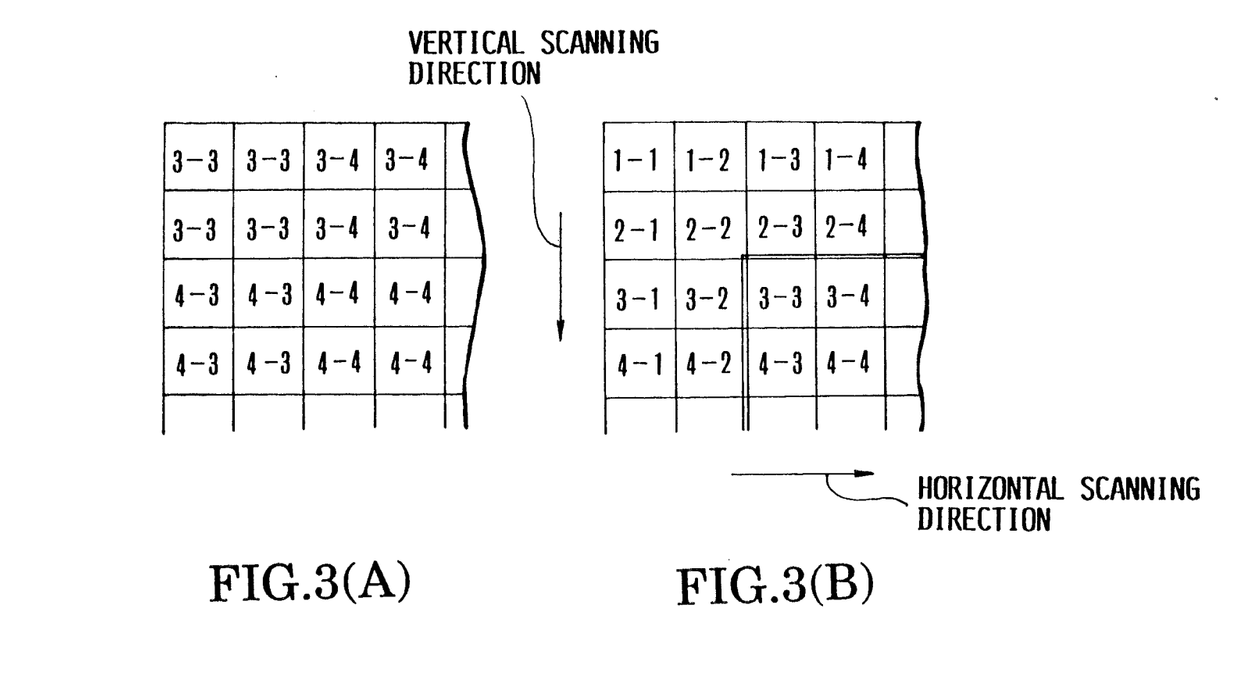
FIGS. 3(A) and 3(B) schematically show the operation of the conventional circuit shown in FIG. 2.

In forming a video signal with a part thereof processed to enlarge a part of an image represented by the video signal, it has been typical to temporarily store the original video signal in a random-access memory (RAM) and then to read out the stored video signal according to a predetermined program. The conventional method is briefly described below:

The description is on the assumption that a video signal corresponding to an enlarged image as shown in FIG. 1(B) of the accompanying drawing is to be obtained from a video signal corresponding to an original image which is shown in FIG. 1(A). FIG. 2 shows by way of example the arrangement of the conventional image enlarging process circuit. FIGS. 3(A) and 3(B) show the operation of the circuit of FIG. 2.

Referring to FIG. 2, an analog video signal for the original image is supplied through an input terminal 20. The input signal is converted into a digital signal by an A/D (analog-to-digital) converter 21. The digital signal is supplied to a field memory 22 which is composed of a RAM. As shown in FIG. 3(B), the storage areas within the field memory 22 are in one-to-one correspondence with each picture element of the image represented by the input digital video signal, as shown in FIG. 3(B). The input signal is written into applicable storage areas in accordance with designated writing addresses. In reading the stored digital video signal out from the field memory 22, the image can be enlarged in the following manner: To enlarge the middle part of it by two times, for example, the areas of addresses 3-3, 3-4, 4-3, 4-4 which store the digital video signal parts corresponding to the picture elements of the middle part of the image are scanned twice in both the horizontal and vertical directions in such a manner as "3-3", "3-3", "3-4", "3-4", ----, as shown in FIG. 3(A). Again referring to FIG. 2, this address control is accomplished in synchronism with the A/D converter 21 and a D/A (digital-to-analog) converter 23 by an address control circuit 24. This circuit 24 operates in accordance with a timing signal output from a timing control signal generating circuit 25. In FIG. 2, a reference symbol W denotes a writing address control signal which controls the process for writing into the field memory 22. Another reference symbol R denotes a reading address control signal which controls the process of reading from the field memory 22. A digital video signal read out from the field memory 22 is supplied to the D/A converter 23 to be converted into an analog video signal which corresponds to the desired enlarged image.

Meanwhile, a method of using the so-called first-in/first-out (hereinafter referred to as FIFO) memory for the above-stated enlarging process has been disclosed in U.S. patent application Ser. No. 300,931.

Generally, an enlarged image which is obtained in the above-stated manner is solely displayed. However, it is conceivable to display it in combination with other images. Such a combined display process, however, necessitates a large circuit arrangement including, among others, a processing circuit for forming a video signal corresponding to the enlarged image; a processing circuit for forming a video signal corresponding to a composite image consisting of the enlarged image and another image; a designation circuit for designating a point of the original image to be located in the middle of the enlarged image; and a designation circuit for designating an image combining pattern to be used in combining images. Such circuit arrangement thus requires many and various designating instructions. However, giving such instructions is highly troublesome for an ordinary operator. Hence, the above-stated enlarged-image combining display function has been limited to business appliances and not provided in the general consumer appliances.

SUMMARY OF THE INVENTION

It is therefore a general object of this invention to provide a novel image processing device which is simply arranged to solve the above-stated problem.

It is a more specific object of the invention to provide an image processing device which is capable of performing an image editing process with an arrangement consisting of a memory for one picture amount of an image signal and a memory for one line amount of the signal.

It is another object of the invention to provide an image processing device which is capable of performing an image editing process without including any circuit for designating each picture element address of an image memory. Under this object, an image processing device which is arranged according to this invention as a preferred embodiment thereof comprises: enlarging means which includes a one-picture-amount memory and a one-line-amount memory and is arranged to enlarge a given area within a motion picture image by performing a signal processing operation; and means for changing the given area.

It is a further object of the invention to provide an image processing device which is capable of performing a novel editing process.

It is a further object of the invention to provide an image processing device which is capable of forming by a simple scanning process various image combining patterns in combining an enlarged image with other images.

It is a still further object of the invention to provide an image processing device which is capable of performing an editing process suited for a video camera.

The above and other objects and features of the invention will become apparent from the following detailed description of embodiments thereof taken in connection with the accompanying drawings.

DETAILED DESCRIPTION OF THE PREFERRED EMBODIMENTS

Figure 4:
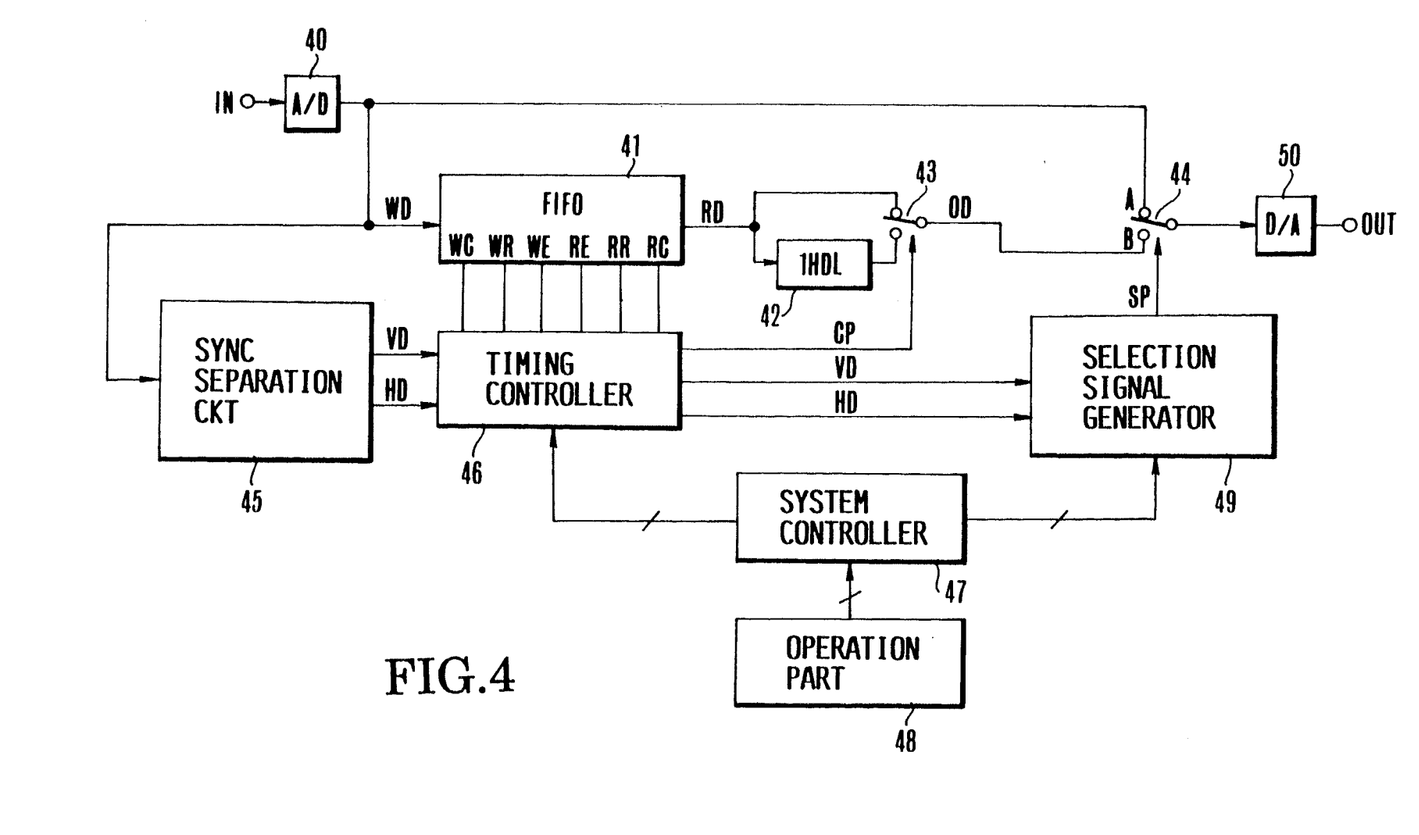
FIG. 4 is a block diagram showing the arrangement of a video signal processing circuit arranged as an embodiment of this invention.

The following describes some embodiments of this invention. FIG. 4 shows in a block diagram the arrangement of a video signal processing circuit which is arranged according to the invention. Referring to FIG. 4, an analog video signal which is, for example, a reproduced video signal obtained by a VTR is supplied to an input terminal IN. This input analog video signal is digitized by an A/D converter 40. All component parts shown between the A/D converter 40 and a D/A converter 50 in FIG. 4 are assumed to handle the digital video signal.

In a case where the image enlarging process is not required, an output control signal SP is output from a selection signal generator 49 which operates in accordance with control data output from a system controller 47. The output control signal SP shifts the connecting position of a switch 44 to one side A thereof. This allows the analog video signal to be output as it is from an output terminal OUT.

Figure 5:
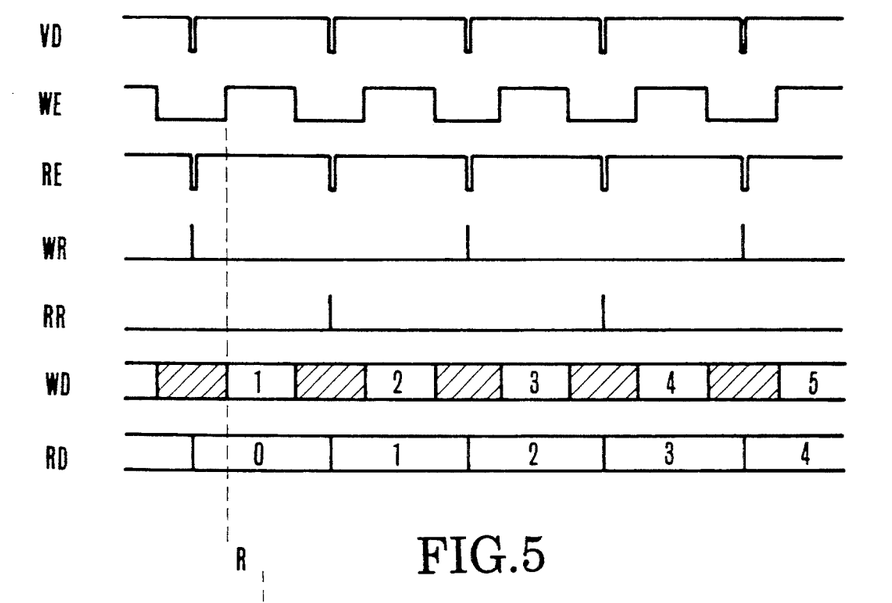
FIGS. 5 and 6 are timing charts showing the operations of various circuit parts of FIG. 4 performing the image enlarging process of the embodiment.
Figure 6:
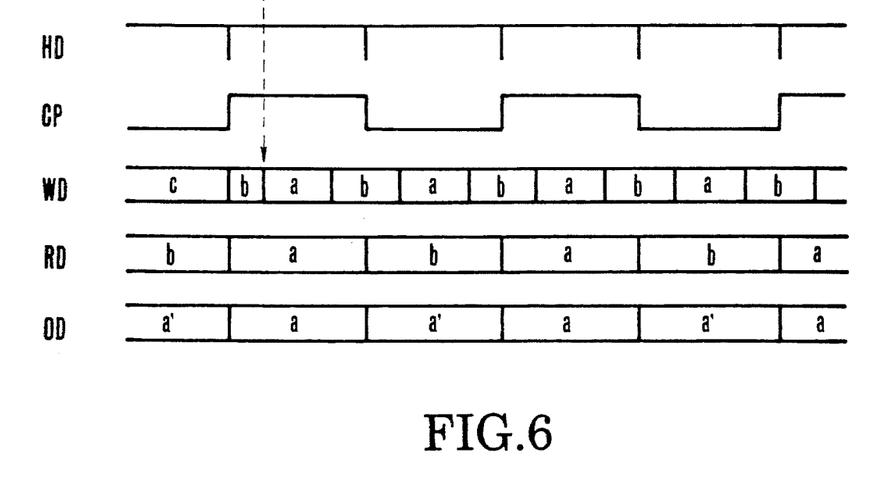
Figure 7:
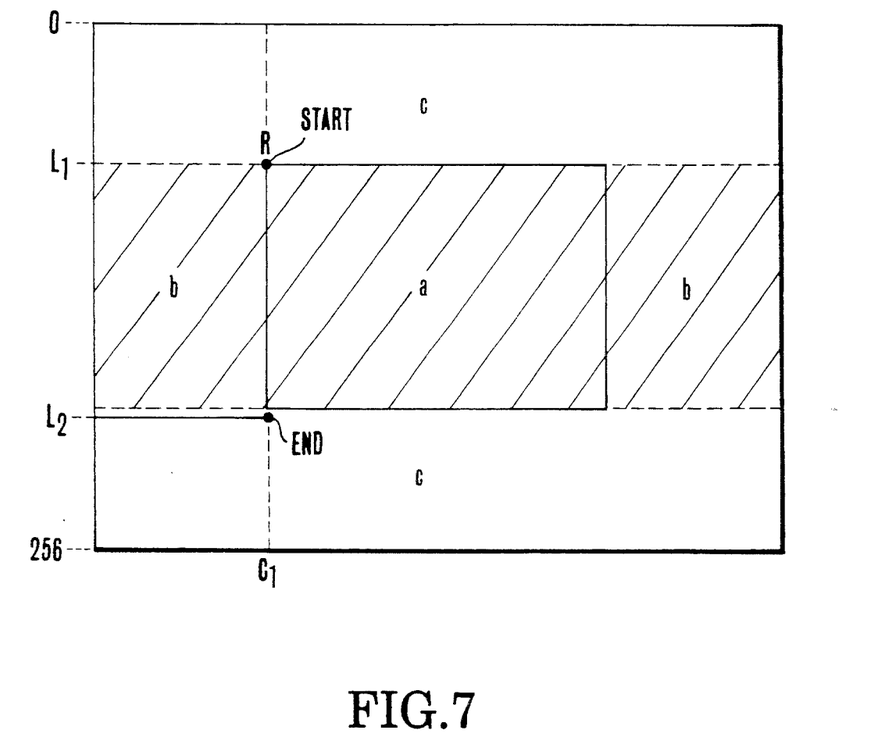
FIG. 7 schematically shows the image enlarging process of the processing circuit of FIG. 4.

The image enlarging process which is characteristic of this invention is described as follows: FIGS. 5 and 6 are timing charts showing the image enlarging process timing of an FIFO memory 41 shown in FIG. 4. FIG. 5 shows the timing of a vertical scanning process and FIG. 6 the timing of a horizontal scanning process. FIG. 7 schematically shows the image enlarging process.

A vertical synchronizing (hereinafter abbreviated as sync) signal VD and a horizontal sync signal HD are separated by a sync separation circuit 45 from the digital video signal output from the A/D converter 40. The vertical and horizontal sync signals VD and HD are supplied to a timing controller 46. The timing controller 46 then determines the output timing of each control signal in synchronism with the vertical and horizontal sync signals VD and HD.

In FIG. 5, a reference symbol VD denotes the vertical sync signal. A symbol WE denotes a writing enable signal for the FIFO memory 41. A symbol RE denotes a reading enable signal. A symbol WR denotes a writing reset signal. A symbol RR denotes a reading reset signal. A symbol WD denotes written image data. A symbol RD denotes read image data.

In forming a video signal which corresponds to an enlarged image of the area "a" of a picture shown in FIG. 7, the processing circuit operates as follows: As shown in FIG. 5, the level of the writing enable signal WE is high (H) to permit writing for a period during which image data corresponding to areas "a" and "b" of FIG. 7 is supplied to the FIFO memory 41. The level of the signal WE is low (L) to inhibit writing for periods other than the above-stated period. The image data only corresponding to the areas "a" is "b" is thus written into the FIFO memory 41. More specifically, the level of the writing enable signal WE becomes high at a point of time when the image data corresponding to a point R of FIG. 7 is supplied to the FIFO memory 41 and becomes low after the lapse of ½ field period. The time point at which the level of the writing enable signal WE becomes high is indicated by a reference symbol R in FIGS. 5 and 6. The writing reset signal WR is a pulse signal produced once in two field periods, while the writing enable signal WE is at a low level, in synchronism with the vertical sync signal in the case of FIG. 5. A writing clock signal WC which is provided for writing into the FIFO memory 41 is of such a frequency that permits image data to be written, during one field period, into all the areas of the FIFO memory 41 which is capable of storing one field amount of data. With the FIFO 41 having the storage capacity for an amount of image data corresponding to one field amount of video signal, a two-field amount of image data corresponding to the areas "a" and "b" of FIG. 7 is written into the FIFO memory 41 during two field periods. Further, in FIG. 5, numerals shown in a part schematically showing the writing image data WD represent field numbers. In the same part, hatched areas indicate periods during which no image data is written into the FIFO memory 41. In FIG. 6, symbols "a", "b" and "c" shown in a part schematically showing the writing image data WD denote the image data corresponding respectively to the areas "a", "b" and "c" shown in FIG. 7.

A reading clock signal RC is set at a frequency which is ½ of the frequency of the writing clock signal WC. Therefore, during two field periods, two-field amount of image data is read out from the FIFO memory 41 in a state of being time-base-expanded by two times. Since the frequency of the reading clock signal RC is ½ of that of the writing clock signal WC, the level of the reading enable signal RE must remain high for a period two times as long as the high-level period of the writing enable signal WE. Therefore, the reading enable signal RE is always at a high level with the exception of the vertical sync periods. The reading reset signal RR which is a pulse signal is generated once in two field periods in synchronism with the vertical sync signal at a point of time at which image data corresponding to a left upper end area of FIG. 7 is supplied to the FIFO memory 41. This gives read-out data RD which is schematically shown at a part RD in FIG. 6. In other words, the image data is read out from the FIFO memory 41 in a manner that: Each of the scanning lines of the areas "a" and "b" of FIG. 7 is time-base-expanded by two times. The image data corresponding to the area "a" and the image data corresponding to the area "b" alternately appear for every horizontal scanning period.

In FIG. 6, a reference symbol CP denotes a control pulse signal supplied from the timing controller 46 to a switch 43. The control pulse signal CP is at a high level for a horizontal scanning period during which the image data corresponding to the area "a" is output from the FIFO memory 41 and at a low level for another horizontal scanning period during which the image data corresponding to the area "b" is output. The connecting position of the switch 43 is on the side of a one-horizontal scanning period delay line (1HDL) 42 when the control pulse signal CP is at the low level and is on the other side when the signal CP is at the high level. Therefore, the image data which corresponds to the area "a" is repeatedly output twice from this switch 43 for every horizontal scanning period. The image data output from this switch 43 shows the image part of the area "a" in a state of being enlarged by two times. A point START and a point END shown in FIG. 7 will be described later herein.

Figure 8A:
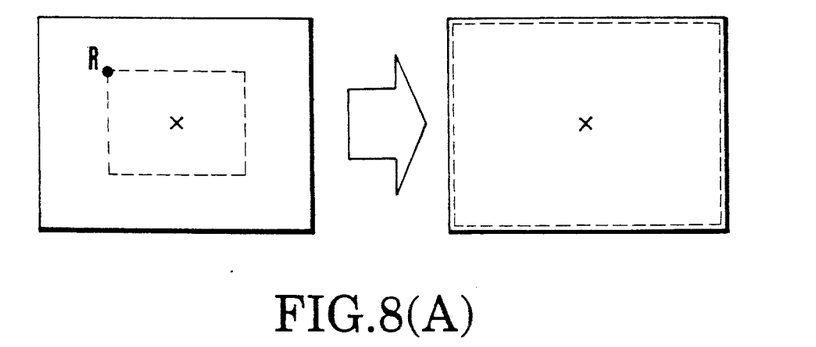
FIGS. 8(A), 8(B) and 8(C) show by way of example composite pictures obtainable by the circuit of FIG. 4 by combining enlarged images with original images.
Figure 8B:
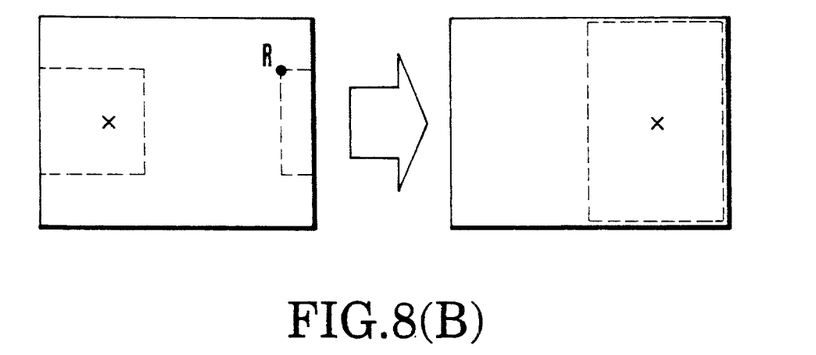
Figure 8C:
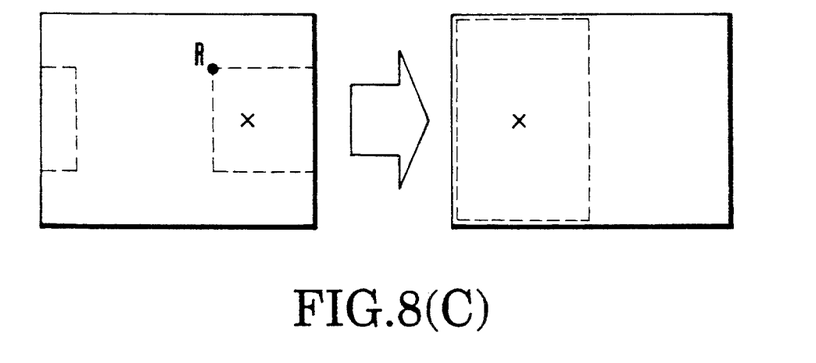

The above-stated enlarged image can be displayed in various manners as shown in FIGS. 8(A), 8(B) and 8(C). When an instruction is given from an operation part 48 to display the enlarged image alone, the system controller 47 causes the selection signal generator 49 to produce a selection control signal SP. This signal SP shifts the connecting position of the switch 44 to one side B thereof. Meanwhile, the timing controller 46 resets the writing address of the FIFO memory 41 at the timing point R of FIGS. 5 and 6. As a result, the switch 43 outputs image data corresponding to an image which can be displayed in an enlarged state covering the full picture plane of a display device (not shown) as shown on the right side of FIG. 8(A) by enlarging an image which is encompassed with a broken line on the left side of FIG. 8(A). The image data thus output from the switch 43 is supplied through one side B of the switch 44 to the D/A converter 50 to be converted into an analog video signal. The analog video signal is output from the output terminal OUT.

In a case where the enlarged image is to be displayed in combination with the original input image, the circuit arrangement operates as follows. When an instruction is given from the operation part 48, for example, to have the enlarged image on the right half of the picture plane of the display device as shown in FIG. 8(B) and the original input image on the left half thereof, the system controller 47 causes the selection signal generator 49 to produce the selection control signal SP. In this case, the signal SP causes the position of the switch 44 to be on the side A thereof during the first half of each horizontal scanning period and to be on the other side B during the latter half of the scanning period. Meanwhile, the timing controller 46 resets the writing address of the FIFO memory 41 at a point of time when image data corresponding to a point R shown on the left part of FIG. 8(B) is supplied to the FIFO memory 41. As a result, the switch 43 outputs image data corresponding to an enlarged image which is obtained by enlarging an image part encompassed with a broken line on the left side of FIG. 8(B) to a size filling the whole picture plane of the display device. Therefore, image data output from the switch 44 corresponds to a composite picture which has its left half occupied by the original input image and its right half by the enlarged image of the left side picture as in a state of having the middle part thereof enlarged by two times, as shown on the right side of FIG. 8(B). The image data output from the switch 44 is supplied to the D/A converter 50 to be converted into an analog signal. The analog signal is output from the output terminal OUT.

Further, if an instruction is given from the operation part 48 to have a picture displayed on the display part of the display device in a state of having the enlarged image on the left half thereof and the original input image on the right half, as shown in FIG. 8(C), the embodiment operates as follows: The system controller 47 causes, through the selection control signal SP, the connecting position of the switch 44 to be on the side B during the first half of each horizontal scanning period and to be on the other side A during the latter half of the period. Meanwhile, the timing controller 46 resets the writing address of the FIFO memory 41 when image data corresponding to a point R shown on the left side of FIG. 8(C) is supplied to the FIFO memory 41. As a result, the switch 44 comes to output image data corresponding to a composite picture which has the original input image on its right half and an enlarged image on its left half in a state of enlarging the middle part of the right side image by two times. The image data thus output from the switch 44 is supplied to the D/A converter 50 to be converted into an analog signal. The analog signal is output from the output terminal OUT.

The image combining process can be accomplished in a different manner, wherein the writing action on the FIFO memory 41 is brought to a stop to obtain the enlarged image in the form of a still picture.

The image processing device arranged in the manner as described above according to this invention is capable of effectively combining an enlarged image with the original image in various patterns by a very simple operation. Further, since the required circuit arrangement is simplified by the use of the FIFO memory, the embodiment can be used for a consumer appliances to enable them to perform the highly sophisticated processes as described in the foregoing.

Further, the invention is not limited to the circuit arrangement shown by way of example in FIG. 4. For example, a random-access memory (RAM) which is shown in FIG. 2 may be employed as a one-field memory. In the event of such modification, generating patterns of the writing or reading address of the RAM are stored in a look-up table of a read-only memory (ROM). Then, the same advantageous effect is attainable by changing the pattern obtained from the ROM from one over to another according to the image combining pattern selected. The use of the RAM arranged in this manner would enable the image processing device to meet requirements for more complex image combining patterns.

As described above, the image processing device according to this invention is capable of combining an enlarged image with other images in varied patterns in response to a simple operation.

Figure 9A:
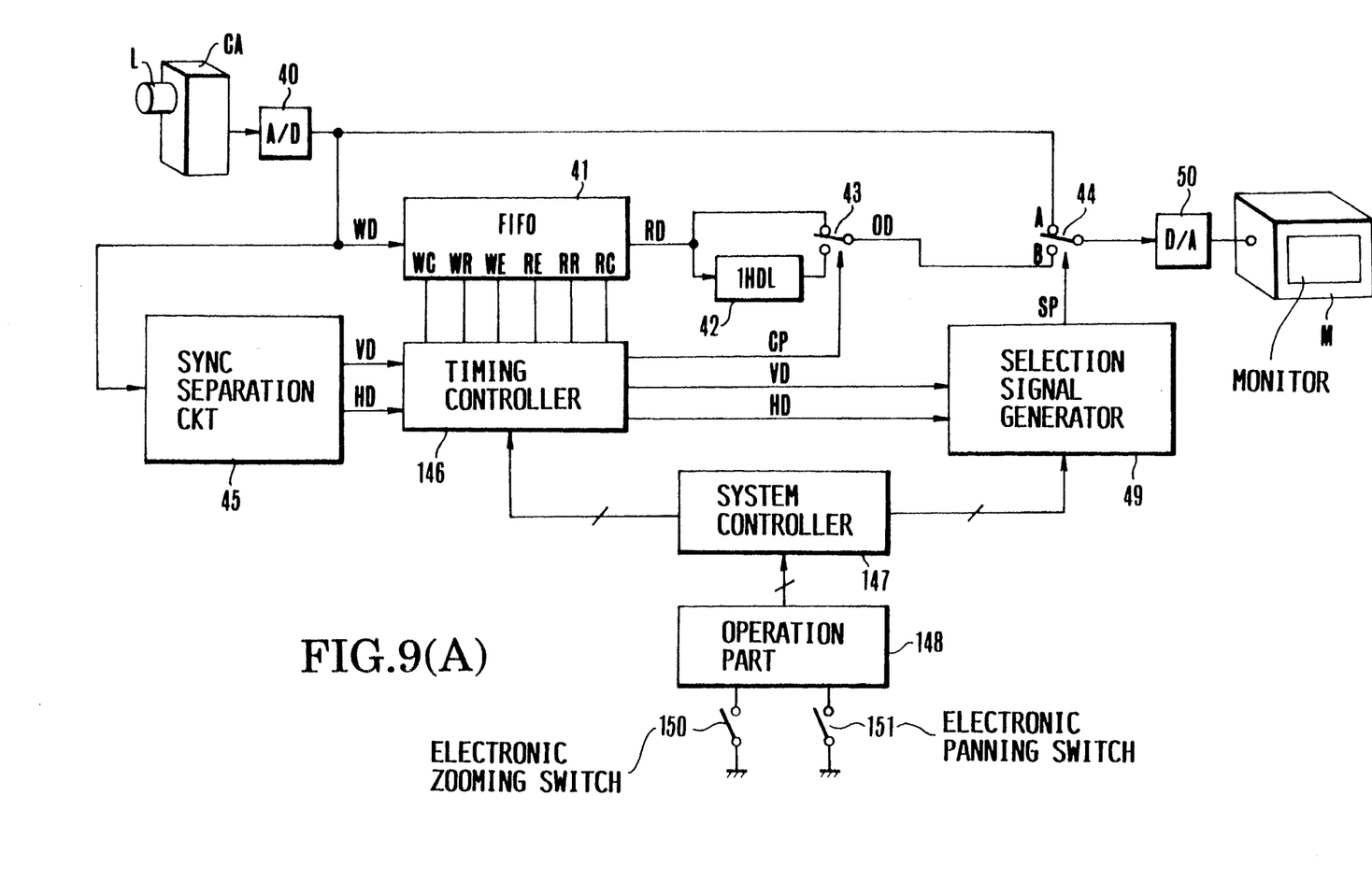
FIGS. 9(A) and 9(B) are block diagrams showing the arrangement of another embodiment of this invention.
Figure 9B:
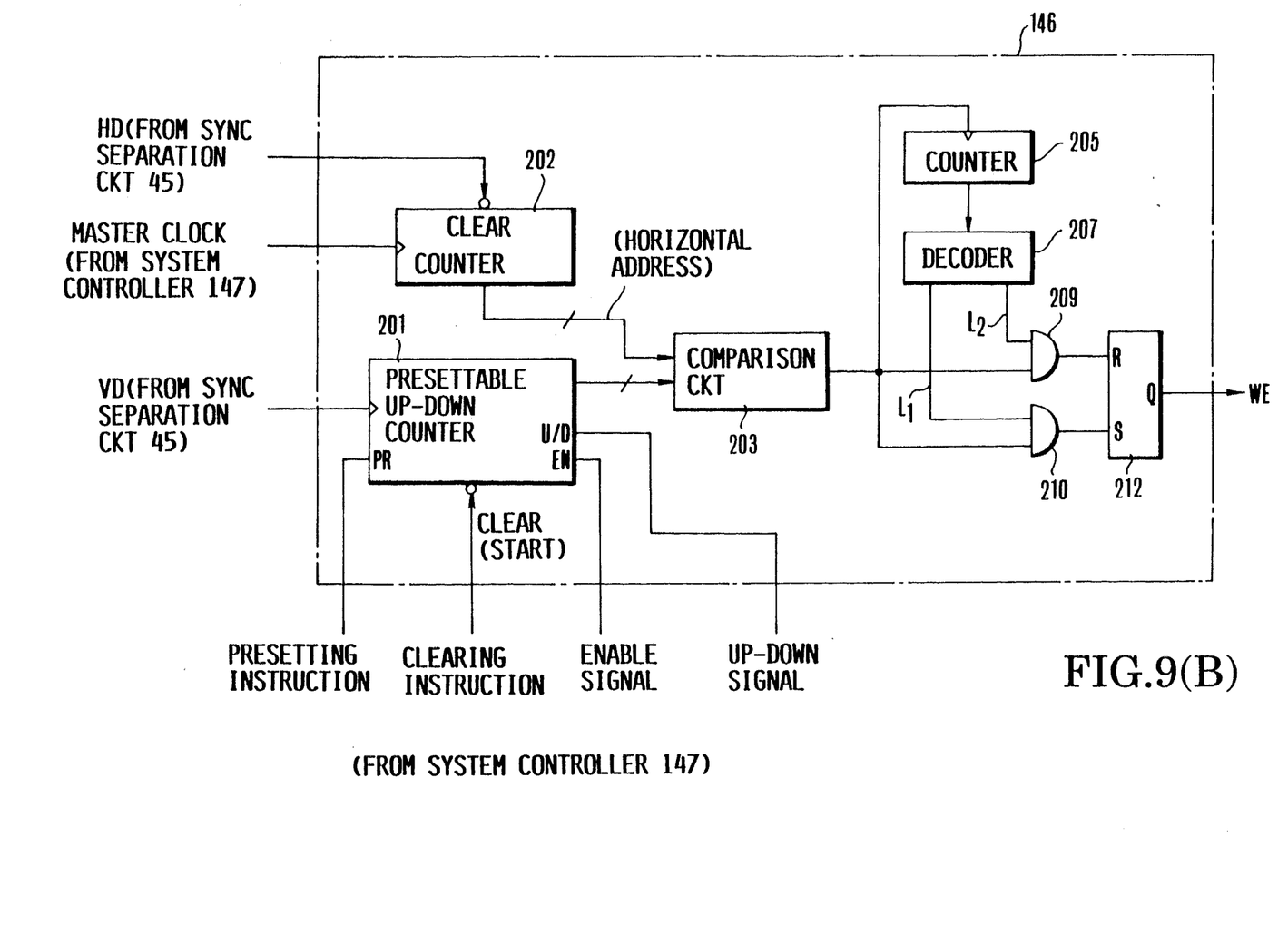

FIGS. 9(A) and 9(B) are block diagrams showing the arrangement of another embodiment of the invention. In FIG. 9(A), component parts having the same functions as those of FIG. 4 are indicated by the same reference numerals and the details of them are omitted from the following description. The timing controller 146, the system controller 147 and the operation part 148 of this embodiment differs from those of FIG. 4. The timing controller 146 of FIG. 9(A) is also arranged to output pulse signals WC, WR, WE, RE, RR and RC. The internal arrangement of the timing controller 146 is as shown in FIG. 9(B). Referring to FIG. 9(B), the timing controller 147 includes various components which are arranged as follows. A counter 202 is arranged to count the pulses of a system control clock signal of a frequency (fsc) of, for example, 3.58 MHz output from the system controller 147 and to be reset by a horizontal sync signal HD. A presettable up-down counter 201 is arranged to be reset, in its enabled state, by a clearing instruction when the instruction is output from the system controller 147 and then to count vertical sync signals VD. While it is not in the enabled state, the presettable up-down counter 201 continuously produces data preset by a preset signal. A comparison circuit 203 is arranged to compare the output of the presettable up-down counter 201 and that of the counter 202. Another counter 205 is arranged to count the output of the comparison circuit 203. A decoder 207 is arranged to decode the output of the counter 205 and to generate signals L1 and L2 when the counted value of horizontal sync signals HD reaches values corresponding to vertical points L1 and L2 shown in FIG. 7. The outputs L1 and L2 of the decoder 207 are supplied respectively to AND gates 209 and 210 which are arranged to obtain the AND of the output of the comparison circuit 203 and the outputs of the decoder 207. A flip-flop 212 is arranged to be set by the output of the AND gate 210 and reset by that of the AND gate 209.

The operation part 148 is provided with a switch 151 for giving an instruction for electronic panning. In FIG. 9(A), a reference symbol CA denotes a video camera which has a lens L. A symbol M denotes a monitor which is provided for the purpose of reproducing the output of a D/A converter 50. The embodiment has a mode in which, while an electronic zooming action is being performed to enlarge a specific area of a given image signal, an electronic panning action can be performed to automatically shift the above-stated area with the lapse of time.

Figure 10:
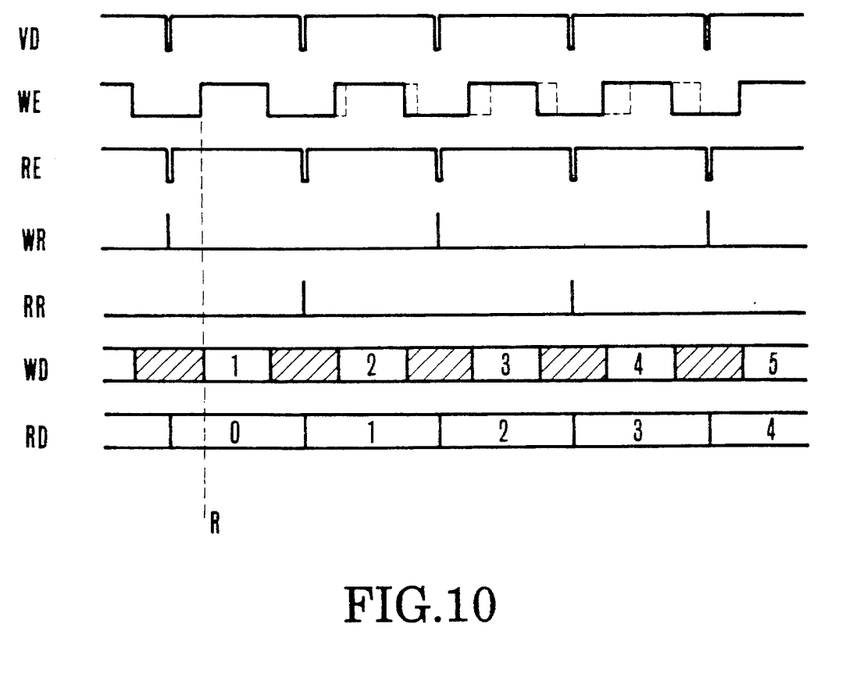
FIG. 10 is a timing chart showing the operation of the embodiment shown in FIGS. 9(A) and 9(B).

In other words, panning can be effected by causing the writing enable signal WE to shift with time as shown in FIG. 10 without moving the lens L.

Referring to FIG. 10, the details of the above-stated operation are as follows: When the switch 151 is closed, the image of the area "a" of FIG. 7 is enlarged and supplied in the enlarged state to the monitor M in the same manner as described in the foregoing with reference to FIG. 4. Under this condition, the system controller 147 causes the address of a point C1 which is shown in FIG. 7 to be set at the presettable counter 201. The comparison circuit 203, under this condition, generates an output which comes to have a high level for image addresses within an area on the right side of a line defined by the point C1 as shown in FIG. 7.

The counter 205 counts the number of horizontal lines of the input video signal on the basis of the output of the comparison circuit 203. In accordance with a counted value thus obtained, the decoder 207 produces high level signals for lines L1 and L2 when the number of lines reaches the vertical points L1 and L2 as shown in FIG. 7. Therefore, the AND gates 209 and 210 produce high level signals at the points of time as indicated by symbols START and END in FIG. 7 respectively. This causes the flip-flop 212 to produce the pulse signal WE as indicated by a full line in FIG. 10. Then, image signals corresponding to the areas "a" and "b" shown in FIG. 7 are taken into the FIFO memory 41. As a result, an image enlarging process is carried out in the same manner as described in the foregoing with reference to FIG. 4.

If the electronic panning switch 151 is manually turned on by the operator at this point of time, the system controller 147 controls an enable signal in such a way as to cause the up-down counter 201 to perform a counting action and also produces a clear instruction to set the counter in an up counting state. This causes the up-down counter 201 to begin to count the vertical sync signals VD. In the initial stage of the count, the counted value of the up-down counter 201 is at a relatively small value. This enables the comparison circuit 203 to generate the high level signal on the left side of the line defined by the point C1 of FIG. 7. The counted value of the counter 201 increases accordingly as the count of the vertical sync signal progresses. As a result, the line of the point C1 of FIG. 7 gradually moves to the right. Then, the image signal written into the FIFO memory 41, i.e., the area "a" of FIG. 7, shifts with time to the right on the picture plane. This state is depicted by the dotted line of the pulse signal WE shown in FIG. 10. In the meantime, the image reproduced at the monitor M is displayed in a state of enlarging the area "a" of FIG. 7. With the electronic panning switch 151 turned on, therefore, the enlarged image which is displayed on the monitor M is automatically shifted in a panning manner despite of the fact that the lens L of the video camera CA shown in FIG. 9(A) is not moved.

While the above has described the counter 201 as being set in an up counting state, the operation part 148 can be provided with another switch for setting the counter 201 in a down counting state. The provision of this switch enables the operator to change the direction of panning as desired. Further, the panning can be allowed to begin from any desired point of the picture plane by adjusting a value preset at the counter 201 by the system controller 147.

If a variable frequency divider is arranged at the input terminal of the counter 201, the speed of panning is automatically variable.

Further, while the embodiment has been described as arranged to permit panning in the horizontal direction, vertical panning can be accomplished by differently setting the decoder 207.

As described in the foregoing, the arrangement of this embodiment permits an electronic panning process.

What is claimed is:

1. An image processing device comprising:
   a) enlarging means for enlarging a given area within an object motion image by a signal processing action, said enlarging means including a one-picture memory capable of storing one picture amount of image data and a one-line memory capable of storing one line amount of image data, wherein said one-line memory has a memory capacity smaller than a memory capacity of said one-picture memory; and
   b) varying means for varying said given area.

2. A device according to claim 1, further comprising:
   c) setting means for giving an instruction for enabling said varying means.

3. An image processing device comprising:
   a) enlarging means for enlarging a given area within an object motion image by a signal processing action, said enlarging means including a one-picture memory capable of storing one picture amount of image data and a one-line memory capable of storing one line amount of image data, said enlarging means including
      (1) first writing means for writing one picture amount of image data in an object motion image into said one-picture memory,
      (2) second writing means for reading out image data stored in said one-picture memory and for writing the read-out image data into said one-line memory, and
      (3) reading means for repeatedly reading image data from said one-line memory for a plurality of times; and
   b) varying means for varying said given data.

4. A device according to claim 3 further comprising setting means for giving an instruction for enabling said varying means.

5. A device according to claim 3 further comprising conversion means for converting said motion picture image into a motion image signal.

6. A device according to claim 1, wherein said conversion means is a video camera.

7. An image processing device comprising:
a) enlarging means for enlarging a given area within an object motion image by a signal processing action, said enlarging means including a one-picture memory capable of storing one picture amount of image data and a one-line memory capable of storing one line amount of image data;
b) varying means for varying said given area; and
c) conversion means for converting said motion picture image into a motion image signal.

8. A device according to claim 7, further comprising setting means for giving an instruction for enabling said varying means.

9. A device according to claim 7, wherein said conversion means is a video camera.

10. An image processing device comprising:
a) designating means for designating a predetermined area within an object image which is to be photoelectrically converted by photo-electric conversion means;
b) supply means for supplying an image signal obtained from the predetermined area designated by said designating means to a monitor to make said image signal reproduced as a visible image; and
c) control means for controlling said supply means in such a way as to cause said predetermined area designated by said designating means to sequentially change with elapsed time, wherein said designating means is arranged to sequentially change its position without changing a size of said predetermined area.

11. A device according to claim 10, wherein said predetermined area is a part of the whole area of said object image.

12. A device according to claim 11, wherein said supply means is arranged to supply an image signal corresponding to said predetermined area to said monitor.

13. A device according to claim 10, further comprising said photo-electric conversion means for converting said object image into an image signal.

14. A device according to claim 13, wherein said photo-electric conversion means is arranged in photoelectrically convert a motion image.

15. An image processing device comprising:
a) designating means for designating a predetermined area within an object image which is to be photoelectrically converted by photo-electric conversion means;
b) supply means for supplying an image signal obtained from the predetermined area designated by said designating means to a monitor to make said image signal reproduced as a visible image;
c) control means for controlling said supply means in such a way as to cause said predetermined area designated by said designating means to sequentially change with elapsed time;
d) generating means for generating an instruction for causing said control means to begin to operate; and
e) time forming means for counting an elapsed time after said instruction is given.

16. A device according to claim 15, wherein said control means is arranged to sequentially change said area designated by said designating means according to an elapsed time formed by said time forming means.

17. A device according to claim 15, wherein said predetermined area is a part of the whole area of said object image.

18. A device according to claim 15, further said supply means is arranged to supply an image signal corresponding to said predetermined area to said monitor.

19. A device according to claim 15, further comprising photo-electric conversion means for converting said object image into an image signal.

20. An image processing device comprising:
a) designating means for designating a predetermined area within an object image which is to be photoelectrically converted by photo-electric conversion means;
b) supply means for supplying an image signal obtained from the predetermined area designated by said designating means to a monitor to make said image signal reproduced as a visible image, said supply means including a memory having a capacity of storing one picture amount of an image signal which represents said object image and means for causing an image signal corresponding to the area designated by said designating means to be alone written into said memory;
c) control means for controlling said supply means in such a way as to cause said predetermined area designated by said designating means to sequentially change with elapsed time;
d) generating means for generating an instruction for causing said control means to begin to operate; and
e) time forming means for counting an elapsed time after said instruction is given.

21. A device according to claim 20, wherein said predetermined area is a part of the whole area of said object image.

22. A device according to claim 20, wherein said supply means is arranged to supply an image signal corresponding to said predetermined area to said monitor.

23. A device according to claim 20, further comprising photo-electric conversion means for converting said object image into an image signal.

24. An image processing device comprising:
a) an enlarging process circuit which is capable of forming an enlarged image by using a memory which is capable of storing one picture amount of a video signal;
b) a combining process circuit for producing a composite image composed of an output of said enlarging process circuit and an input video signal;
c) selection means for selecting a combining pattern for said combining process circuit; and
d) switching means for changing the timing of writing or reading into or out of said memory disposed within said enlarging process circuit in accordance with a selecting action of said selection means.

25. A device according to claim 24, wherein said memory is formed by a first-in/first-out memory, and wherein said switching means is arranged to control the reset timing of writing into said first-in/first-out memory.

* * * * *

UNITED STATES PATENT AND TRADEMARK OFFICE
CERTIFICATE OF CORRECTION

PATENT NO. : 5,153,728

DATED : October 6, 1992

INVENTOR(S) : Tadayoshi Nakayama and Koji Takahashi

It is certified that error appears in the above-identified patent and that said Letters Patent is hereby corrected as shown below:

On the title page:

Insert -- [30] Feb. 28, 1989 [JP]....1-048904 --

Col. 3, line 38.   Change "an" to -- a --

Col. 6, line 20.   Delete "a"

Col. 8, line 9.    Delete "of" (first occurrence)

Col. 9, line 1.    Change "claim 1" to -- claim 3 --

Col. 9, line 45.   Change "in" to -- to --

Signed and Sealed this

Fourteenth Day of December, 1993

Attest:

BRUCE LEHMAN

*Attesting Officer*         *Commissioner of Patents and Trademarks*